(12) United States Patent
Moon (10) Patent No.: US 11,648,092 B2
(45) Date of Patent: May 16, 2023

(54) EXCHANGEABLE OR REPLACEABLE MAXILLARY SKELETAL EXPANDER

(71) Applicant: BIOMATERIALS KOREA INC., Hanam-si (KR)

(72) Inventor: Won Moon, Los Angeles, CA (US)

(73) Assignee: BIOMATERIALS KOREA INC., Hanam-si (KR)

( * ) Notice: Subject to any disclaimer, the term of this patent is extended or adjusted under 35 U.S.C. 154(b) by 146 days.

(21) Appl. No.: 17/079,913

(22) Filed: Oct. 26, 2020

(65) Prior Publication Data

US 2021/0137645 A1 May 13, 2021

(30) Foreign Application Priority Data

Nov. 11, 2019 (KR) .......................... 10-2019-0143592

(51) Int. Cl.
*A61C 7/10* (2006.01)
*A61C 7/02* (2006.01)
*A61C 7/06* (2006.01)

(52) U.S. Cl.
CPC .................. *A61C 7/10* (2013.01); *A61C 7/02* (2013.01); *A61C 7/06* (2013.01)

(58) Field of Classification Search
CPC ........................................................ A61C 7/10
See application file for complete search history.

(56) References Cited

U.S. PATENT DOCUMENTS

| 3,832,778 | A | | 9/1974 | Wallshein | |
| 4,571,177 | A | * | 2/1986 | Dahan | A61C 7/10 433/7 |
| 5,281,133 | A | * | 1/1994 | Farzin-Nia | A61C 7/10 433/7 |
| 2002/0142259 | A1 | * | 10/2002 | Ceppatelli | A61C 7/10 433/7 |
| 2015/0056566 | A1 | * | 2/2015 | Moon | A61C 7/10 433/7 |
| 2019/0159873 | A1 | * | 5/2019 | Kaveh | A61C 8/0096 |
| 2020/0337808 | A1 | * | 10/2020 | Kim | A61C 7/10 |
| 2020/0383710 | A1 | * | 12/2020 | Kaveh | A61B 17/663 |
| 2021/0059790 | A1 | * | 3/2021 | Lee | A61C 7/10 |

FOREIGN PATENT DOCUMENTS

| CN | 108969129 A | 12/2018 |
| KR | 20-0457198 | 12/2011 |
| KR | 10-2015-0024245 | 3/2015 |
| KR | 10-1718928 B1 | 3/2017 |
| KR | 10-2018-132320 A | 12/2018 |
| KR | 10-2001034 B1 | 7/2019 |
| KR | 10-2020-0103004 A | 9/2020 |
| TW | 476277 U | 2/2002 |
| WO | 2008/011698 A2 | 1/2008 |
| WO | 2018/139690 A1 | 8/2018 |
| WO | 2019-104255 A1 | 5/2019 |

* cited by examiner

*Primary Examiner* — Ralph A Lewis
(74) *Attorney, Agent, or Firm* — Bridgeway IP Law Group, PLLC; Sang Ho Lee; Hyun Woo Shin (57) ABSTRACT

Provided is an exchangeable or replaceable maxillary skeletal expander. The exchangeable maxillary skeletal expander including: a pair of guides configured to be fixed by micro implants implanted into maxilla; and an expansion part including: a pair of main bodies configured to be inserted and extended while sliding between the pair of guides; and an expansion screw configured to penetrate the pair of main bodies and adjust an interval between the pair of main bodies.

6 Claims, 9 Drawing Sheets

EXCHANGEABLE OR REPLACEABLE MAXILLARY SKELETAL EXPANDER

CROSS-REFERENCE TO RELATED APPLICATIONS

This application claims the priority of Korean Patent Application No. 10-2019-0143592 filed on Nov. 11, 2019, in the Korean Intellectual Property Office, the disclosure of which is incorporated herein by reference.

BACKGROUND

Field

The present disclosure relates to an exchangeable or replaceable maxillary skeletal expander.

Description of the Related Art

A maxillary skeletal expander is a device used in the treatment of a patient whose maxilla is less developed than the mandible, and the maxillary skeletal expander is configured to expand the maxilla to facilitate the treatment. Bones, which constitute the face, are arranged like puzzles and thus are easy to move during growth. The maxilla does not have only a single bone but has several bones that are engaged with one another. If the upper jaw is too small in size to accommodate permanent teeth, it is possible to widen the maxillary skeletal itself by spreading the bones in the center of the palate.

Figure 1:
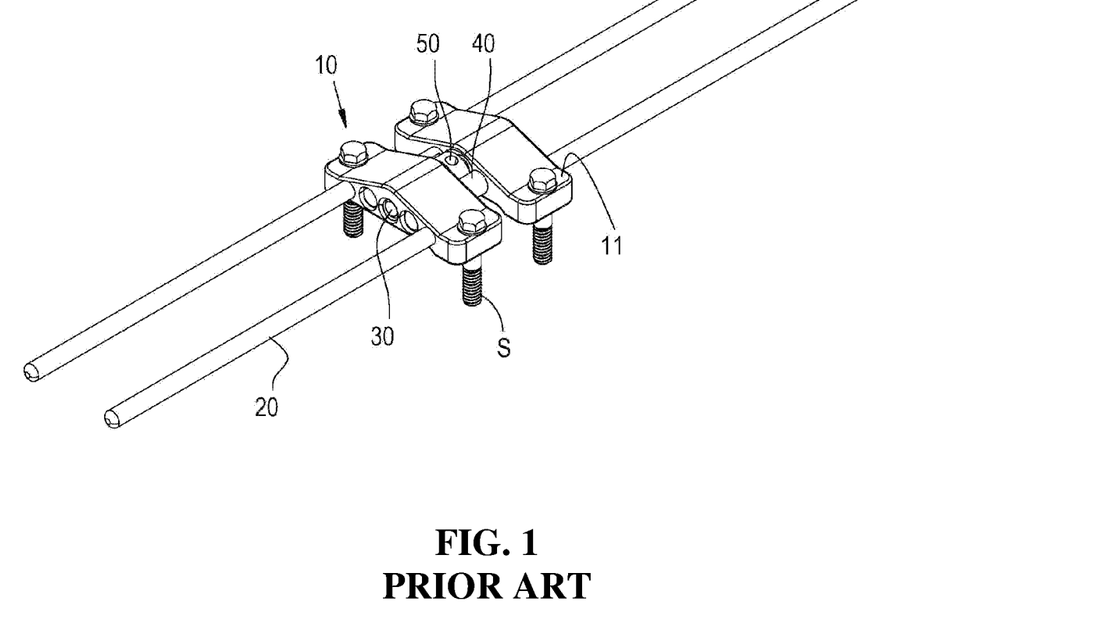
FIG. 1 is a perspective view of a maxillary skeletal expander using micro implants in the related art.
Figure 2:
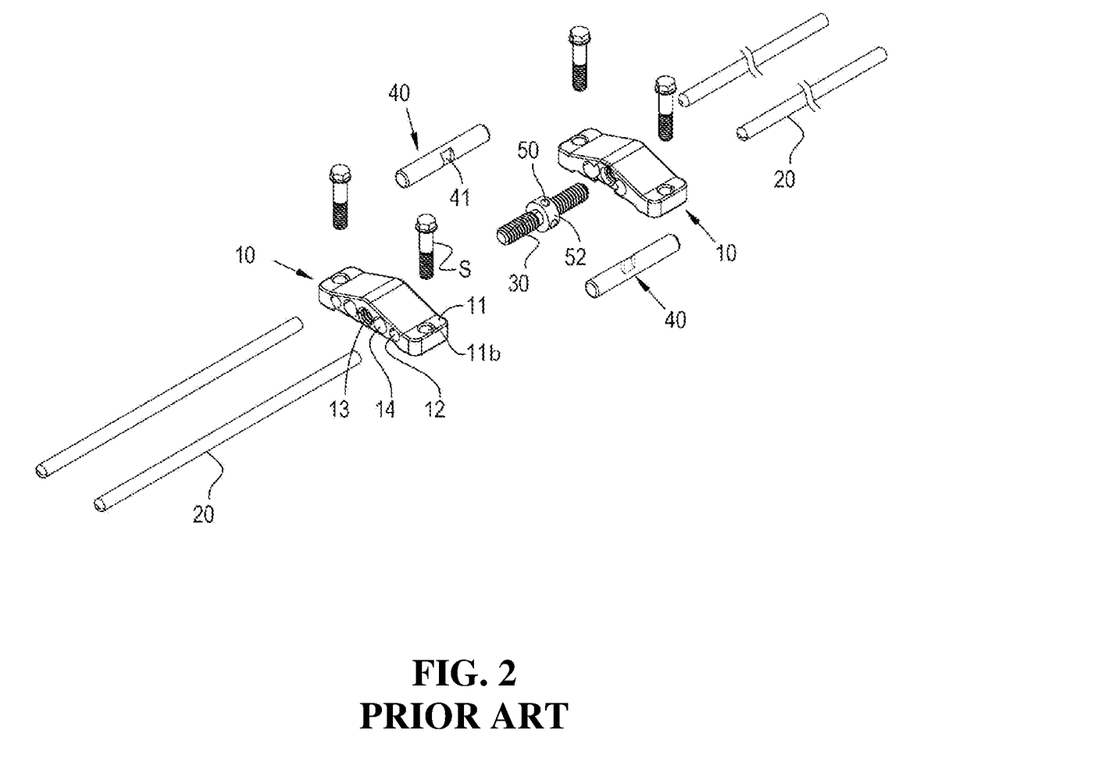
FIG. 2 is an exploded perspective view of the maxillary skeletal expander using the micro implants in the related art.

FIG. 1 is a perspective view of a maxillary skeletal expander using micro implants in the related art, and FIG. 2 is an exploded perspective view of the maxillary skeletal expander using the micro implants in the related art.

The maxillary skeletal expander using the micro implants in the related art includes a pair of main bodies 10, arms 20 each having one end fixed to the main body 10 and the other end extending toward teeth B, an expansion screw 30 having both opposite portions inserted into the pair of main bodies 10 and configured to adjust an interval between the pair of main bodies 10, guide rails 40 each having both opposite portions inserted into the pair of main bodies 10 and configured to guide the motions of the main bodies, key holes 50 formed integrally with the expansion screw 30, screw insertion portions 11 formed integrally with the main bodies 10 and having screw insertion holes 11b configured to guide micro screws S to be implanted into the maxilla, and tooth fixing units 60 formed integrally with the arms 20 and configured to be fixed to the patient's teeth. The micro implants comprises mini implants, mini screws or TADS.

The main body 10 has a plurality of insertion holes 12, 13, and 14. An expansion screw insertion hole 13, into which the expansion screw 30 is inserted, is positioned at a center, a pair of guide rail insertion holes 14 is positioned at both sides of the expansion screw insertion hole 13, and a pair of arm insertion holes 12 is positioned outside the pair of guide rail insertion holes 14. A direction in which the plurality of insertion holes 12, 13, and 14 is arranged is perpendicular to a direction in which the arm 20, the expansion screw 30, and the guide rails 40 extend.

The expansion screw 30 and the expansion screw insertion hole 13 have screw threads engaged with each other. A key (not illustrated) is inserted into the key hole 50 formed at a central portion of the expansion screw 30, and then the key (not illustrated) is rotated, such that the expansion screw 30 may be rotated. The interval between the pair of main bodies 10 may be increased or decreased in accordance with a direction in which the expansion screw 30 is rotated. Hereinafter, for ease of description, a direction in which the main bodies 10 move when the expansion screw 30 is rotated, that is, the directions in which the arms 20, the expansion screw 30, and the guide rails 40 extend is defined as a left-right direction, and the direction in which the plurality of insertion holes 12, 13, and 14 is arranged is defined as a front-rear direction.

Because the maxillary skeletal expander using the micro implants is a device to be applied to an interior of an oral cavity, the maxillary skeletal expander is small in overall size, and respective components of the maxillary skeletal expander are also very small in size. Therefore, a diameter of the expansion screw 30 is also very small. As a result, it is not easy to form, in the expansion screw 30, the key hole 50 having a size enough to receive sufficient rotational force through the key (not illustrated) and to allow the key to withstand the rotational force without being fractured. Therefore, an expansion part 52, which has a larger diameter than the screw portions to be inserted into the main bodies 10, may be formed at a center of the expansion screw 30, and the key hole 50 may be formed in the expansion part 52.

When the expansion screw 30 is rotated to increase the interval between the main bodies 10, the pair of guide rails 40 guides the main bodies 10 so that the main bodies 10 may move smoothly. Unlike the expansion screw 30, the guide rails 40 each have a smooth bar shape having no screw thread, and the guide rails 40 are positioned at front and rear sides of the expansion screw 30. With the guide rails 40, the interval between the pair of main bodies 10 may be uniform from a front end to a rear end of each of the main bodies 10. In addition, the guide rail 40 has an expansion-part escaping portion 41 in order to prevent interference with the expansion part 52. The expansion-part escaping portion 41 is a groove having a size and a shape formed to the extent that no friction occurs between the expansion-part escaping portion 41 and the expansion part 52.

The arms 20 are positioned outside the guide rails 40, that is, positioned at a front side of the front-positioned guide rail 40 and at a rear side of the rear-positioned guide rail 40. The tooth fixing unit (not illustrated) is coupled at an end of each of the arms 20 and allows the maxillary skeletal expander using the micro implants S to be fixed to the maxilla. Unlike the guide rails 40, the arms 20 are fixed to the main bodies 10. The pair of arms 20 is fixed to one main body 10, such that a total of two pairs of arms 20, that is, the four arms 20 are provided.

Meanwhile, the main body 10 has the screw insertion portions 11 provided outside the plurality of insertion holes 12, 13, and 14, that is, at front and rear sides of the plurality of insertion holes 12, 13, and 14. The screw insertion hole 11b is formed in the screw insertion portion 11, and the main body 10 may be fixed to the maxilla of the maxillary skeletal by using the mini-screw S.

SUMMARY

The present disclosure has been made in an effort to provide an exchangeable or replaceable maxillary skeletal expander in which an expansion part configured to provide expansion force for expanding the maxilla is configured to be exchangeable or replaceable, thereby increasing an expansion range of the maxilla.

The present disclosure provides a exchangeable or replaceable maxillary skeletal expander including: a pair of guides configured to be fixed by screws implanted into maxilla; and an expansion part including: a pair of main bodies configured to be inserted and extended while sliding between the pair of guides; and an expansion screw configured to penetrate the pair of main bodies and adjust an interval between the pair of main bodies.

In addition, as another example of the present disclosure, the exchangeable or replaceable maxillary skeletal expander may further include a pair of replacement guides having two ends fixed to ends of the pair of guides that face each other, the pair of replacement guides being configured to assist in replacing the expansion part by adjusting an interval between the pair of guides.

In addition, as still another example of the present disclosure, each of the replacement guides may have an auxiliary expansion screw configured to adjust the interval between the guides.

In addition, as yet another example of the present disclosure, the pair of guides may be provided with anti-withdrawal protrusions protruding upward from the main bodies in order to prevent the pair of main bodies from being withdrawn from the guides.

In addition, as still yet another example of the present disclosure, a rotating coupling portion, to which a rotation adjusting part is coupled to rotate the expansion screw, may be coupled at a center of the expansion screw.

In addition, as a further example of the present disclosure, the exchangeable or replaceable maxillary skeletal expander may further include a wire hub detachably installed on the expansion screw, in which a correcting wire is inserted into the wire hub.

According to the exchangeable or replaceable maxillary skeletal expander provided by the present disclosure, the expansion part, which is inserted into the guides fixed to the maxillary skeletal and to expand the maxillary skeletal, may be replaced, such that it is possible to increase an expansion range of the maxillary skeletal.

In addition, only the expansion part may be replaced without removing the screw implanted into the maxillary skeletal, thereby reducing a patient's discomfort and pain.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE PREFERRED EMBODIMENT

Hereinafter, the present disclosure will be described in more detail with reference to the drawings.

Figure 3:
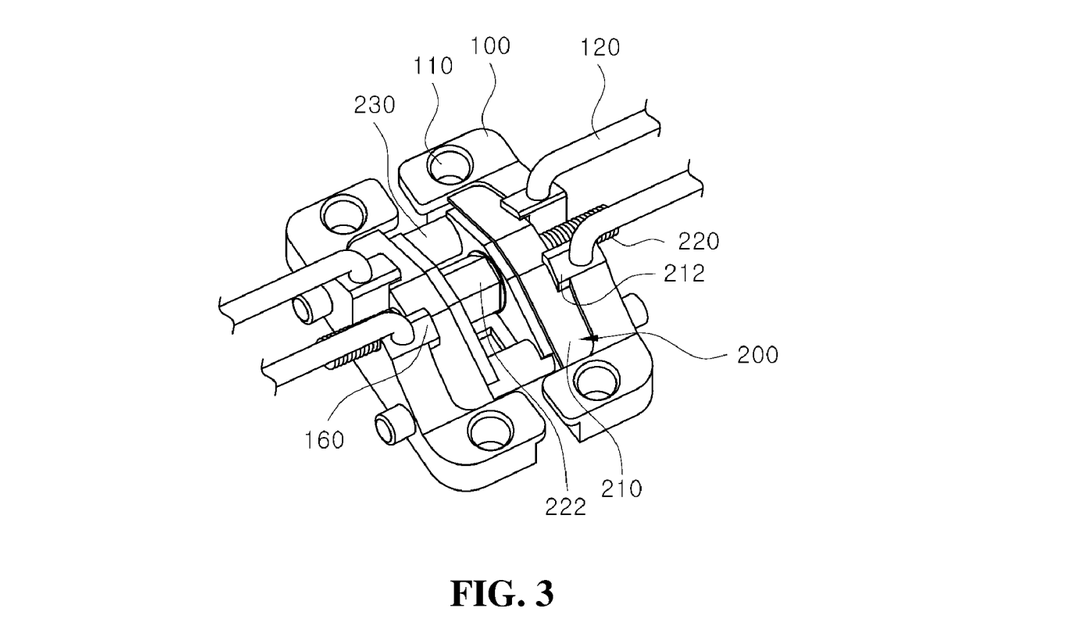
FIG. 3 is a view illustrating a state in which a small-sized expansion part of an exchangeable or replaceable maxillary skeletal expander according to an exemplary embodiment of the present disclosure is mounted.
Figure 4:
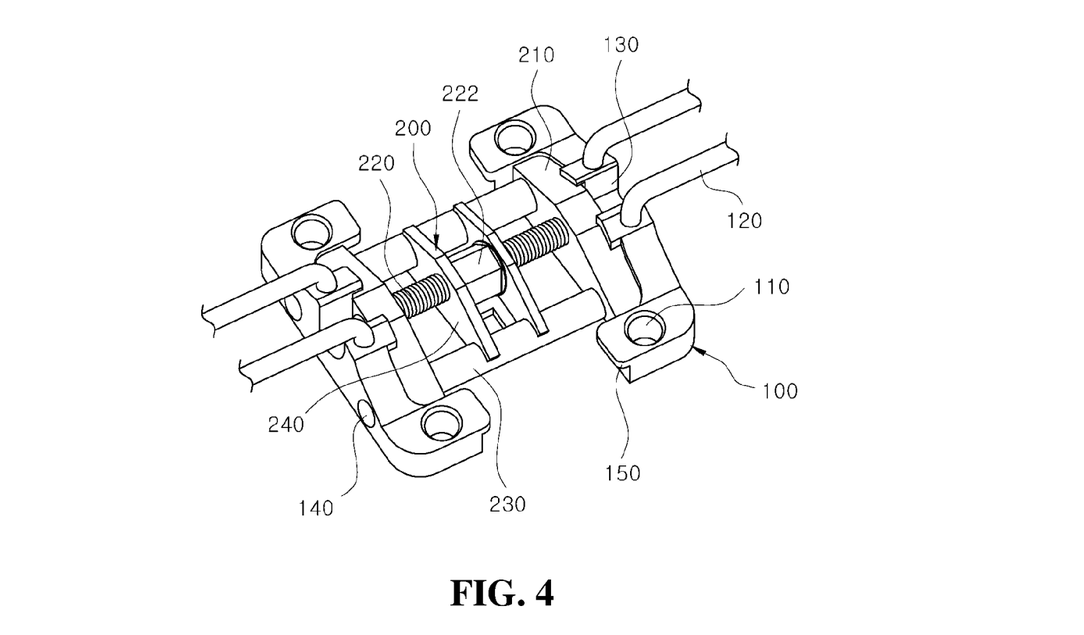
FIG. 4 is a view illustrating a state in which the small-sized expansion part of the exchangeable or replaceable maxillary skeletal expander according to the exemplary embodiment of the present disclosure is expanded.

FIG. 3 is a view illustrating a state in which a small-sized expansion part of an exchangeable or replaceable maxillary skeletal expander according to an exemplary embodiment of the present disclosure is mounted, and FIG. 4 is a view illustrating a state in which the small-sized expansion part of the exchangeable or replaceable maxillary skeletal expander according to the exemplary embodiment of the present disclosure is expanded.

An exchangeable or replaceable maxillary skeletal expander according to an exemplary embodiment of the present disclosure includes a pair of guides 100 fixed by screws to be implanted into the maxilla. Each of the guides 100 has one or more screw holes 110 into which the screws may be implanted. In addition, the guide 100 may have one or more arms 120 configured to be fixed to a molar tooth or the like.

An expansion part 200 is coupled to or extended from the pair of guides 100 while sliding, such that the expansion part 200 is installed to be exchangeable or replaceable. The expansion part 200 includes a pair of main bodies 210 coupled to a pair of guides 100, respectively, an expansion screw 220 configured to adjust an interval between the pair of main bodies 210, and guide bars 230 configured to accessorily guide a movement direction of the pair of main bodies 210 that move away from each other in accordance with a rotation of the expansion screw 220. In order to prevent the main body 210 from being withdrawn from the guide, the guide 100 has an anti-withdrawal protrusion 160 protruding upward from the main body 210, and a supporter 170 (see FIG. 7) configured to support a lower end of the main body 210.

Two ends of the expansion screw 220 and two ends of each of the guide bars 230 penetrate the main bodies 210, and a rotation adjusting part 222 is formed at a center of the expansion screw 220 so that the expansion screw 220 may be easily rotated by using a tool or the like. Plates 240 may be installed at both sides of the rotation adjusting part 222 in order to support the guide bars 230 and the expansion screw 220 and protect the rotation adjusting part 222.

The guide 100 also has a screw receiving portion 130 configured to receive the expansion screw 220 and also has a guide bar insertion holes 140 into which the guide bars 230 may be inserted.

As the rotation adjusting part 222 is rotated toward one side, the interval between the main bodies 210 and the interval between the guides 100 implanted into the maxillary skeletal are increased together. FIG. 4 is a view illustrating a state in which the small-sized expansion part 200 is maximally expanded. That is, FIG. 4 illustrates a state in which the interval between the main bodies 210 of the small-sized expansion part 200 is maximally increased. As the interval between the main bodies 210 is maximally increased, the expansion screw 220, which has been received in the guides 100, are coupled only to the main bodies 210, and the guide bars 230, which have been inserted into the guides 100, are coupled only to the main body 210.

In this case, replacement guides may be installed on the guides 100 in order to maintain the interval between the guides 100 or to provide a slight marginal space in addition to a maximally expanded size of the expansion part 200, such that the expansion part 200 may be replaced. In order to install the replacement guides, each of the guides 100 has, at both ends thereof, ribs 150 configured to be engaged with the replacement guide.

Figure 5:
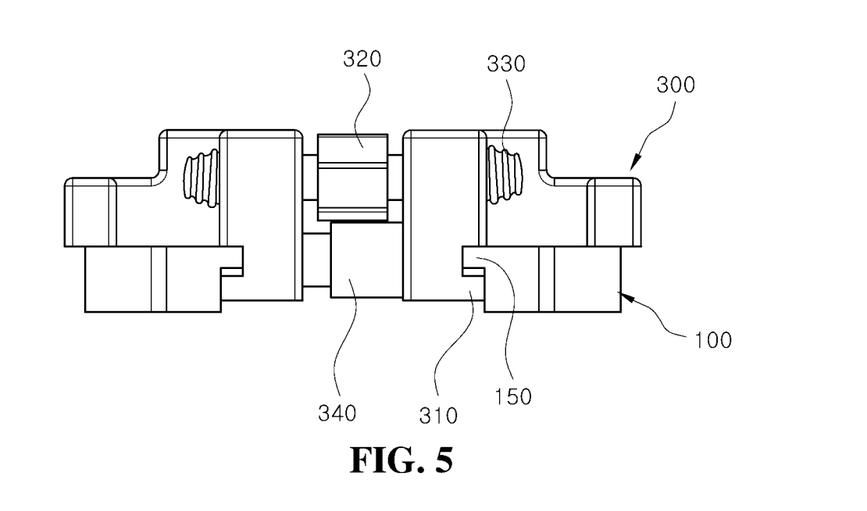
FIG. 5 is a side view illustrating a state in which replacement guides are installed on the exchangeable or replaceable maxillary skeletal expander according to the exemplary embodiment of the present disclosure.
Figure 6:
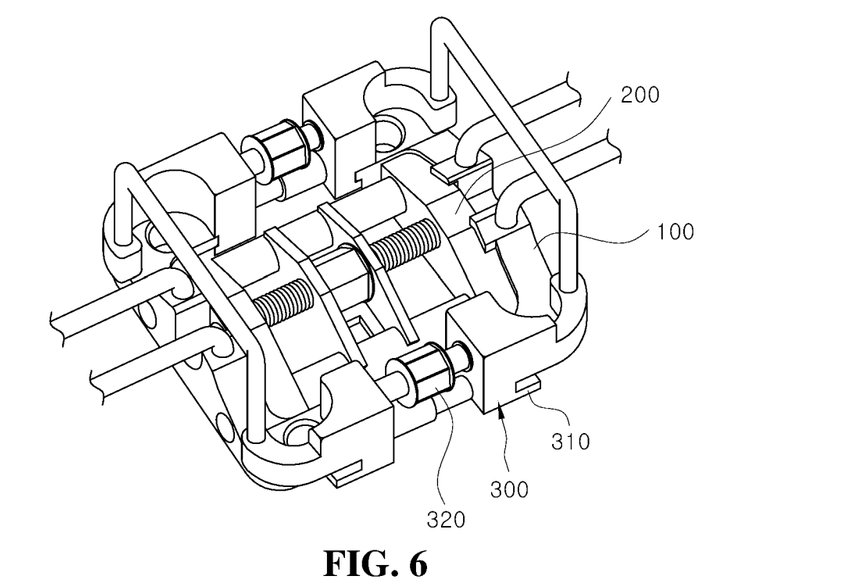
FIG. 6 is a perspective view illustrating a state in which the replacement guides are installed on the exchangeable or replaceable maxillary skeletal expander according to the exemplary embodiment of the present disclosure.

FIG. 5 is a side view illustrating a state in which the replacement guides are installed on the exchangeable or replaceable maxillary skeletal expander according to the exemplary embodiment of the present disclosure, and FIG. 6 is a perspective view illustrating a state in which the replacement guides are installed on the exchangeable or replaceable maxillary skeletal expander according to the exemplary embodiment of the present disclosure.

A pair of replacement guides 300 of the exchangeable or replaceable maxillary skeletal expander according to the exemplary embodiment of the present disclosure is mounted on the guides 100, and two ends of one replacement guide 300 are coupled to ends at the same side of the pair of guides 100. That is, based on a side at which the exchangeable or replaceable maxillary skeletal expander is installed on the maxilla, two ends of the replacement guide 300 installed at a front side are coupled to a front end of the left guide 100 and a front end of the right guide 100, and two ends of the replacement guide 300 installed at a rear side are coupled to a rear end of the left guide 100 and a rear end of the right guide 100.

The replacement guide 300 has a pair of guide coupling portions 310 configured to be coupled to the guides 100 and includes a guide screw 330 configured to adjust an interval between the guide coupling portions 310, a guide adjusting portion 320 to which a tool may be applied to rotate the guide screw 330, and a guide bar 340 configured to guide motions of the guide coupling portions 310. When the guide screw 330 of the replacement guide 300 is rotated, the guide coupling portions 310 of the replacement guide 300 are engaged with the ribs 150 at both ends of the guides 100, and the interval between the guide coupling portions 310 is increased. In this case, the replacement guide 300 maintains the interval between the guides 100 corresponding to the interval of the expanded small-sized expansion part 200 or further increases the interval in order to assist the small-sized expansion part 200 to be extended from the guides 100.

Figure 7:
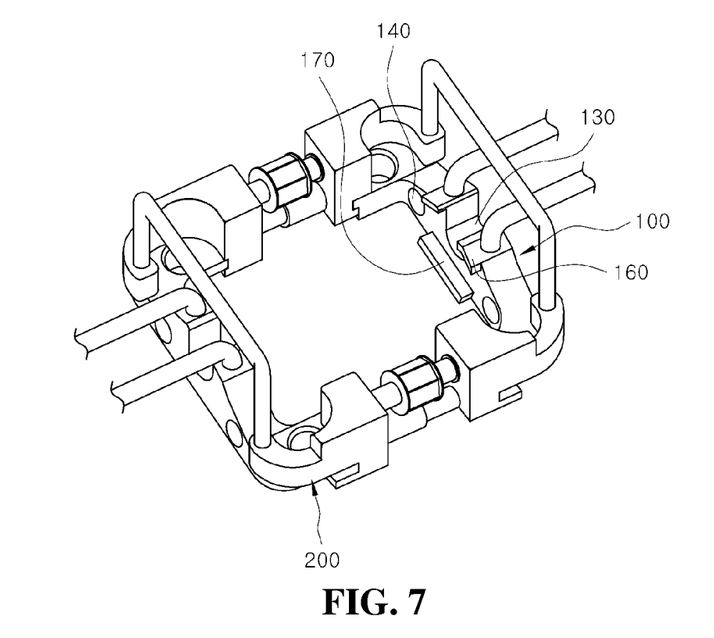
FIG. 7 is a view illustrating a state in which the small-sized expansion part is removed after the replacement guides are installed on the exchangeable or replaceable maxillary skeletal expander according to the exemplary embodiment of the present disclosure.

FIG. 7 is a view illustrating a state in which the small-sized expansion part is removed after the replacement guides are installed on the exchangeable or replaceable maxillary skeletal expander according to the exemplary embodiment of the present disclosure.

The replacement guides 300 are coupled to the guides 100, and then the interval between the guide coupling portions 310 is increased. Further, the expansion screw 220 of the small-sized expansion part 200 is rotated reversely, such that the interval between the main bodies 210 is decreased. Therefore, when the main bodies 210 and the anti-withdrawal protrusions 160 are decoupled from one another, the small-sized expansion parts 200 may be removed from the guides 100.

Figure 8:
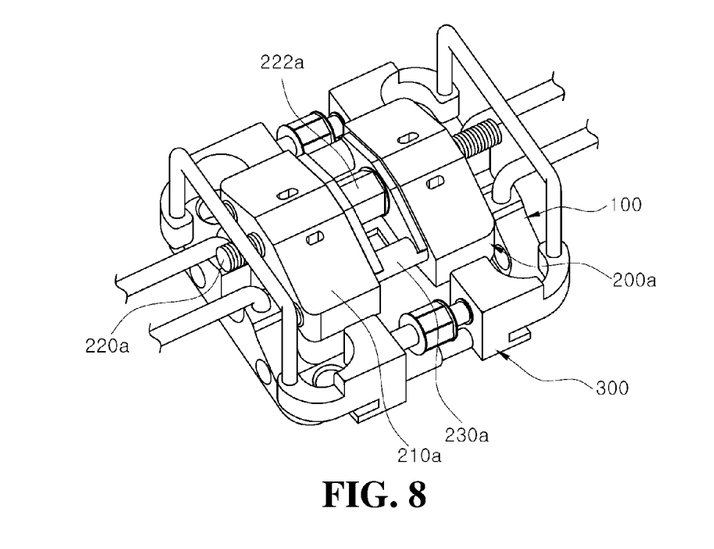
FIG. 8 is a view illustrating a state in which a large-sized expansion part is installed after the replacement guides are installed on the exchangeable or replaceable maxillary skeletal expander according to the exemplary embodiment of the present disclosure.
Figure 9:
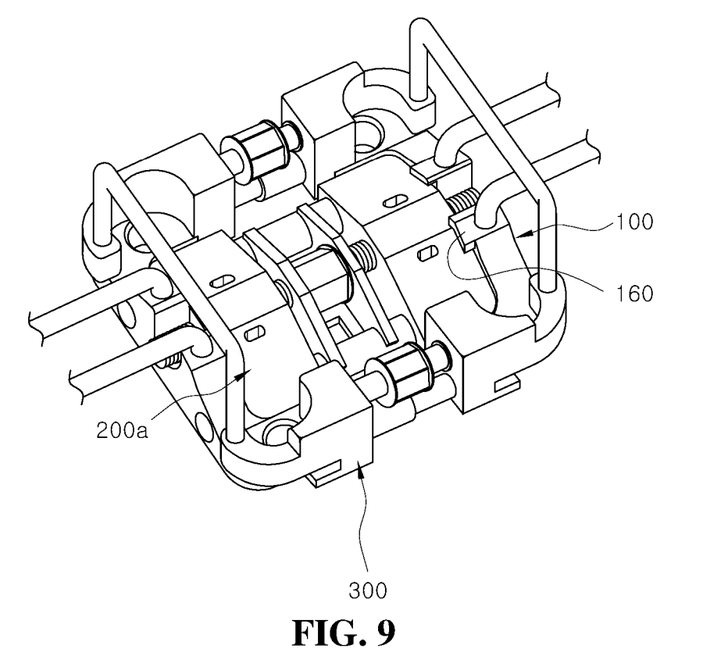
FIG. 9 is a view illustrating a state in which the large-sized expansion part is installed after the replacement guides are installed on the exchangeable or replaceable maxillary skeletal expander according to the exemplary embodiment of the present disclosure.

FIG. 8 is a view illustrating a state in which a large-sized expansion part is installed after the replacement guides are installed on the exchangeable or replaceable maxillary skeletal expander according to the exemplary embodiment of the present disclosure, and FIG. 9 is a view illustrating a state in which the large-sized expansion part is installed after the replacement guides are installed on the exchangeable or replaceable maxillary skeletal expander according to the exemplary embodiment of the present disclosure.

Like the small-sized expansion part, a large-sized expansion part 200a includes a pair of main bodies 210a coupled to the guides 100, an expansion screw 220a configured to adjust an interval between the main bodies 210a, a rotation adjusting part 222a configured to easily rotate the expansion screw 220a, and guide bars 230a configured to guide movements of the main bodies 210a.

The large-sized expansion part 200a is placed between the pair of guides 100 and placed on the supporters 170 of the guides 100, and then the rotation adjusting part 222a is rotated to increase the interval between the main bodies 210a. As such, the main bodies 210a are moved to below the anti-withdrawal protrusions 160 of the guides 100 and may be fixed to the guides 100.

Figure 10:
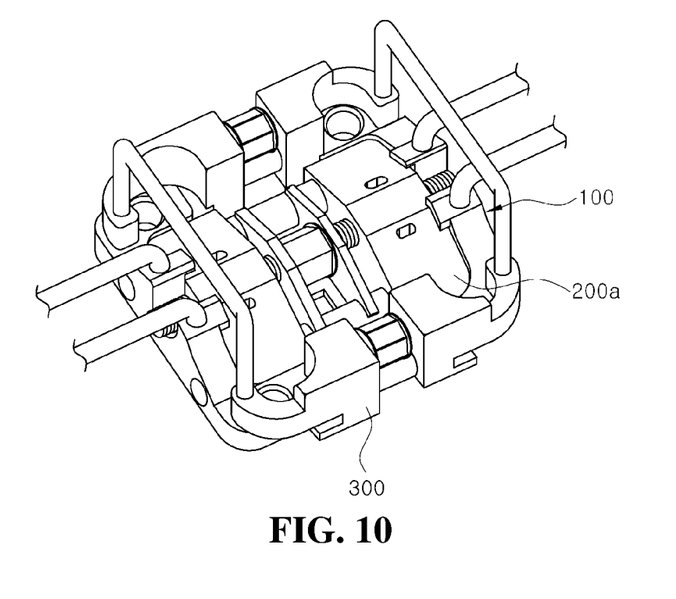
FIG. 10 is a view illustrating a process of removing the replacement guides of the exchangeable or replaceable maxillary skeletal expander according to the exemplary embodiment of the present disclosure.
Figure 11:
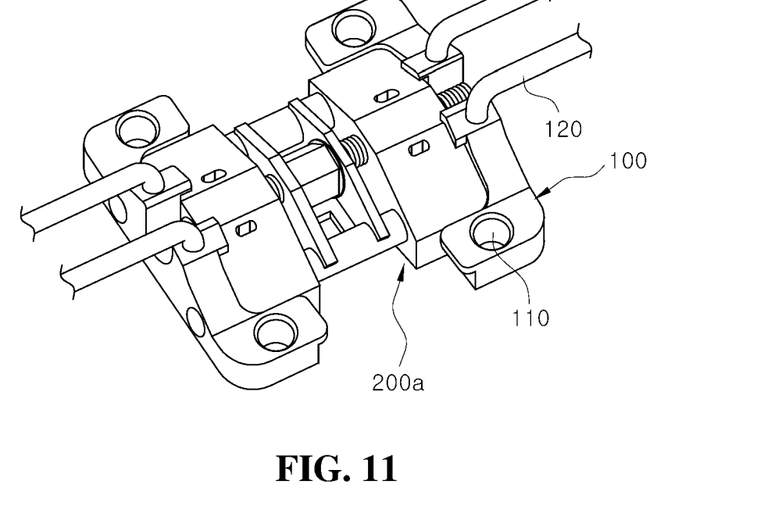
FIG. 11 is a view illustrating a state in which the large-sized expansion part is installed on the exchangeable or replaceable maxillary skeletal expander according to the exemplary embodiment of the present disclosure.

FIG. 10 is a view illustrating a process of removing the replacement guides of the exchangeable or replaceable maxillary skeletal expander according to the exemplary embodiment of the present disclosure, and FIG. 11 is a view illustrating a state in which the large-sized expansion part is installed on the exchangeable or replaceable maxillary skeletal expander according to the exemplary embodiment of the present disclosure.

The large-sized expansion part 200a is fixed to the guides 100, and then the replacement guides 300 are removed from the guides 100. In order to remove the replacement guides 300, the intervals between the guide coupling portions 310 of the replacement guides 300 are decreased again, the guide coupling portions 310 and the ribs 150 are decoupled from one another, and then replacement guides 300 are removed.

Figure 12:
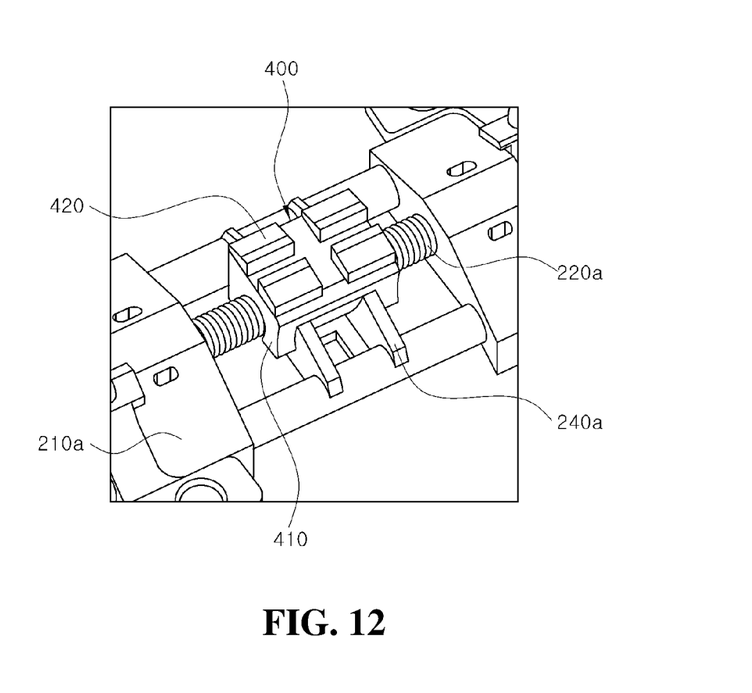
FIG. 12 is a view illustrating a state in which the large-sized expansion part of the exchangeable or replaceable maxillary skeletal expander according to the exemplary embodiment of the present disclosure is expanded.
Figure 13:
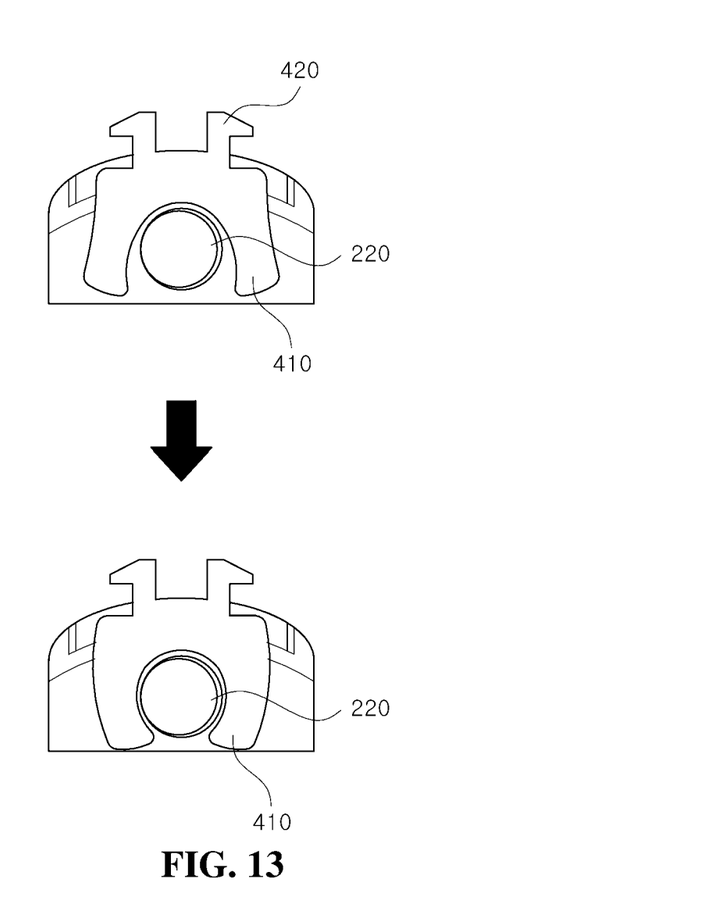
FIG. 13 is a view illustrating a process of coupling a wire hub to the exchangeable or replaceable maxillary skeletal expander according to the exemplary embodiment of the present disclosure.

FIG. 12 is a view illustrating a state in which a wire hub is coupled to the exchangeable or replaceable maxillary skeletal expander according to the exemplary embodiment of the present disclosure, and FIG. 13 is a view illustrating a process of coupling a wire hub to the exchangeable or replaceable maxillary skeletal expander according to the exemplary embodiment of the present disclosure.

A wire hub 400 is a selectively provided and coupled to or removed from the screw 220a of the exchangeable or replaceable maxillary skeletal expander. The wire hub 400 has two pairs of legs 410 configured to be coupled to the screw 220a and the plates 240a and to surround the screw 220a. The two pairs of legs 410 are formed outside the plates 240a. In addition, a hub portion 420 configured to receive the wire is formed on an upper portion of the wire hub 400.

Figure 14:
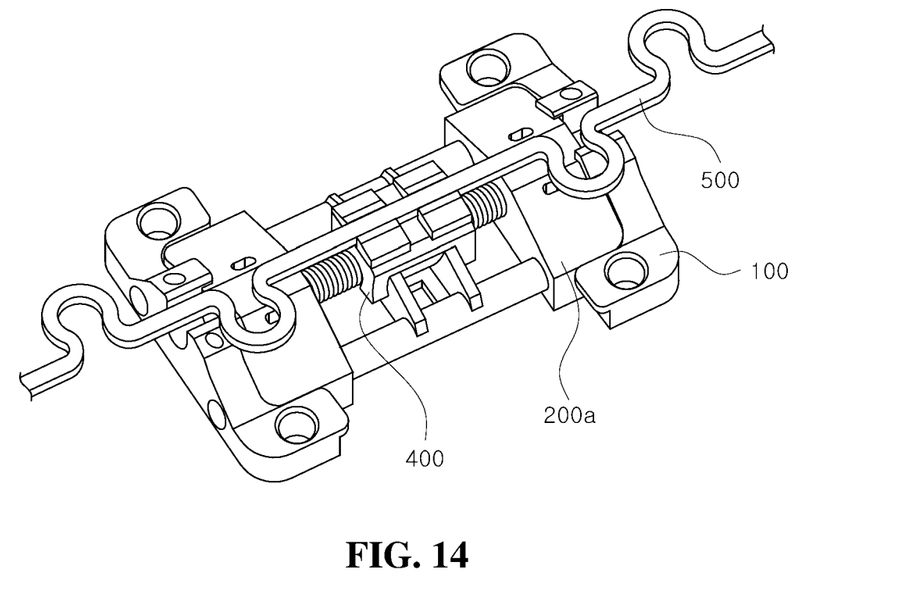
FIG. 14 is a view illustrating a state in which the wire hub and a wire are installed on the exchangeable or replaceable maxillary skeletal expander according to the exemplary embodiment of the present disclosure.

FIG. 14 is a view illustrating a state in which the wire hub and a wire are installed on the exchangeable or replaceable maxillary skeletal expander according to the exemplary embodiment of the present disclosure.

In the exemplary embodiment of the present disclosure, a bent wire is applied as a wire 500 installed on the wire hub 400, but various types of wires, such as a button wire or a wire having a hook formed at an end thereof, may be applied.

What is claimed is:

1. An exchangeable or replaceable maxillary skeletal expander comprising:
   a pair of guides comprising one or more screw holes configured to accommodate micro implants implanted into maxilla;
   an expansion part includingdetachably coupled to the pair of guides, the expansion part comprising:
   a pair of main bodies comprising a screw hole for accommodating an expansion screw, wherein each of the pair of main bodies is detachably coupled to a corresponding guide, and the pair of main bodies are configured to be inserted and extended while sliding between the pair of guides; and
   the expansion screw configured to penetrate the screw hole of the pair of main bodies and to adjust an interval between the pair of main bodies by rotation thereof; and
   a pair of replacement guides detachably coupled to the pair of guides,
   wherein each of the pair of replacements guides has two ends, each of the two ends is detachably coupled to a respective end of the pair of guides that face each other, and the pair of replacement guides are configured to adjust an interval between the pair of guides.

2. The exchangeable or replaceable maxillary skeletal expander of claim 1, wherein the each of the replacement guides comprises an auxiliary expansion screw configured to adjust the interval between the pair of guides.

3. The exchangeable or replaceable maxillary skeletal expander of claim 1, wherein the each of the pair of guides comprises anti-withdrawal protrusions protruding upward from the pair of guides towards the main bodies, and the anti-withdrawal protrusions prevent the pair of main bodies from being withdrawn from the pair of guides.

4. The exchangeable or replaceable maxillary skeletal expander of claim 1, wherein a rotating coupling portion, to which a rotation adjusting part is coupled to rotate the expansion screw, is coupled at a center of the expansion screw.

5. The exchangeable or replaceable maxillary skeletal expander of claim 1, further comprising:
   a wire hub detachably installed on the expansion screw and comprising a groove disposed at a top side thereof for accommodating a correcting wire; and
   the correcting wire is-inserted into the groove of the wire hub.

6. The exchangeable or replaceable maxillary skeletal expander of claim 1, wherein the each of the pair of guides has a front end and a rear end,
   wherein each of the two ends of one of the pair of replacement guides is detachably coupled to a front end of one of the pair of guides and a front end of the other of the pair of guides, respectively, and
   wherein each of the two ends of the other of the pair of replacement guides is detachably coupled to a rear end of the one of the pair of guides and a rear end of the other of the pair of guides, respectively.

* * * * *